Jan. 2, 1934.  E. BELLINI  1,941,457
ERROR COMPENSATING DEVICE FOR RADIOGONIOMETERS
Filed Jan. 4, 1930  2 Sheets-Sheet 1

INVENTOR
ETTORE BELLINI
BY
ATTORNEY

Patented Jan. 2, 1934

1,941,457

UNITED STATES PATENT OFFICE 1,941,457

ERROR COMPENSATING DEVICE FOR RADIOGONIOMETERS

Ettore Bellini, Sarcelles, France, assignor to Compagnie Générale de Telegraphie sans Fil, a corporation of France Application January 4, 1930, Serial No. 418,454, and in France January 23, 1929

6 Claims. (Cl. 250—11)

A radiogoniometer is an apparatus by means of which the direction of a wireless transmitting station may be determined. This apparatus comprises in its essentials a coil frame with horizontal axis, allowing a vertical rotation, and electrically connected to the receiving apparatus. By means of this frame the maximum received intensity is revealed if the plane of the windings passes through the transmitting station and no reception at all is indicated if this plane is at right angles to the direction of the transmitting station. By this means the direction of a sending station may be determined.

This apparatus is used on board of ships and is the means to reach port in foggy weather. On the other hand, it is well known that the metallic parts of a ship (hull, masts, stocks, etc.) are the sources of errors in the bearing of radiogoniometers resulting in the necessity of plotting an error curve and a corresponding curve for corrections. Each bearing taken being subject to corrections according to the data of this curve, exactly as is the case with the magnetic compass. But, while the latter is subject to four different errors, the radiogoniometer is only influenced by the "quadrantal" error. In fact, the error has zero value if the sending station is located in the directions 0°, 90°, 180°, and 270° and it reaches its maximum if the transmitting post is in the directions 45°, 135°, 225° and 315° (the direction 0° being the forward direction of the ship). The maximum error may reach the value of 20°.

In certain cases it may be of advantage to use a mechanical system which compensates the errors and by means of which, therefore, bearings, already corrected, are obtained, instead of being forced to refer to the curve of corrections for each reading of the bearing.

The present invention has as its object just such a type of mechanical compensator of errors.

This apparatus comprises in its essentials a pair of gears of a 2:1 ratio the larger of which is mounted on the axis of the goniometer. The shaft of the small gear carries a disk whose plane may be disposed at a variable angle to the shaft. The disk is connected to the needle in any suitable manner thereby imparting oscillations to it whose amplitude depends on the angle of adjustment of the disk. If the disk is at right angles to the shaft of the small pinion, the needle stays tranquil upon turning the frame.

A better understanding will be had of the invention from the following specification and therefrom when read with the accompanying drawings in which:

Fig. 2 shows apparatus for automatically applying the correctings to the indicator, while

Fig. 1 shows a curve of corrections for ships. This curve is for practically all cases almost exactly sinusoidal.

Figure 1:
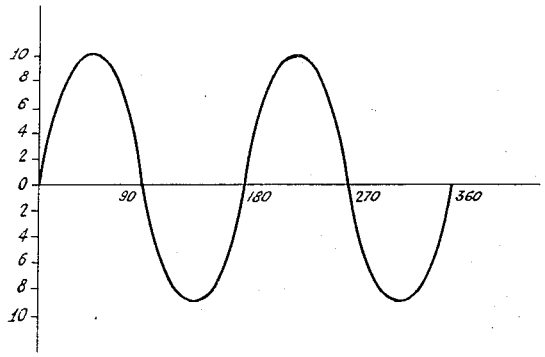
Fig. 1 shows a curve representation of the corrections necessary to derive the true pointing position.
Figure 2:
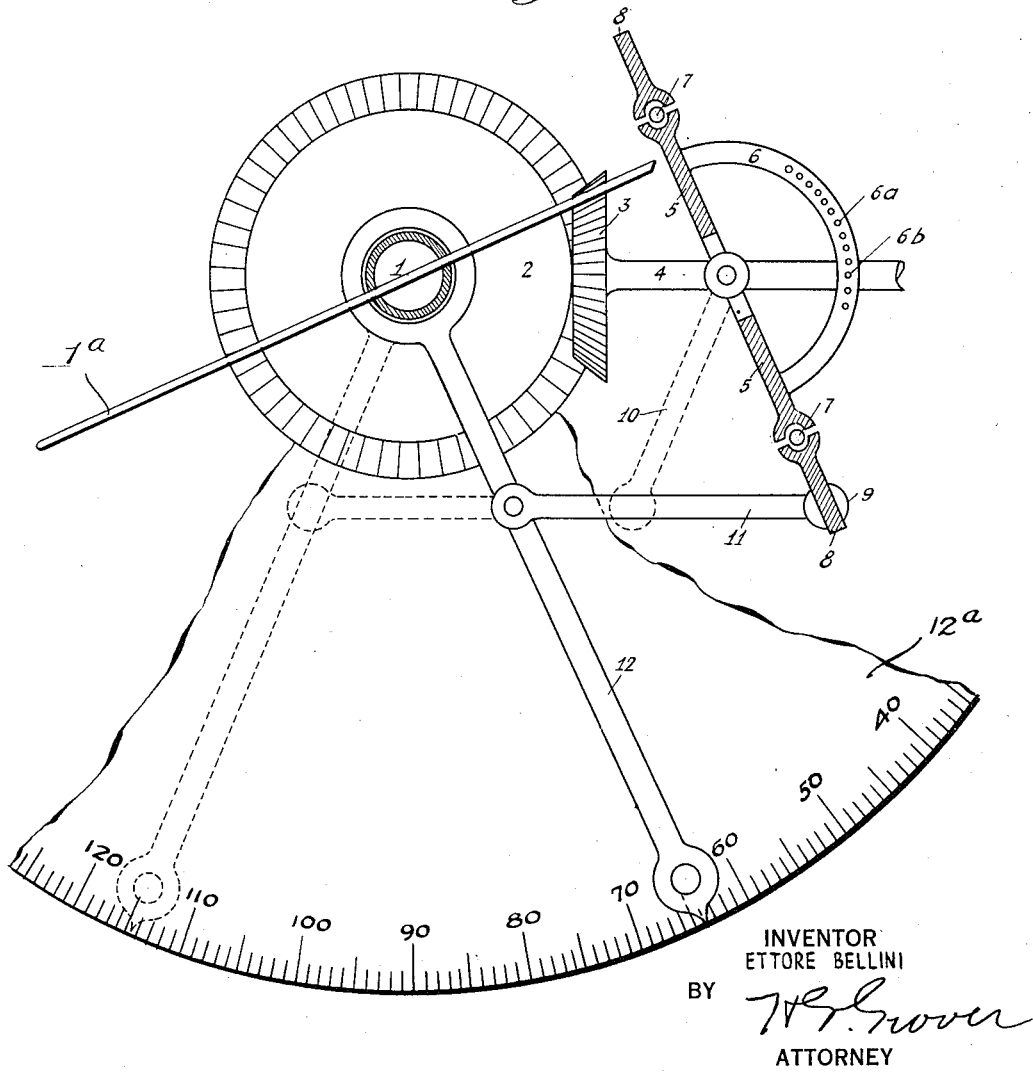

Fig. 2 represents, by way of example only, one of the embodiments of the invention. In this figure, 1 represents a section through the tube, i. e., axis of the goniometer, to which the frame aerial 1a is attached. To this tube is keyed a conic wheel 2 which engages another conic wheel 3 which has half the number of teeth of wheel 2. On the shaft 4 of wheel 3 a disk 5 is mounted which is carried with said shaft and may be inclined at a certain angle to this shaft. The disk 5 may be fixed in this position with the aid of a radius 6 containing perforations 6a. By inserting a pin 6b in one of the perforations and in a corresponding hole located on the shaft 4 the disk is held in the desired position. This non-continuous fastening system may be advantageously replaced by a system with continuous attachment.

The disk 5 contains on its circumference a groove in which are located the balls 7 by means of which a grooved crown 8 may move from position 9 to position 10 without turning around shaft 4. A link 11 transmits the reciprocating movement of disk 5 to the needle 12 which is loosely mounted on the shaft of the radiogoniometer.

The needle 12 acts as mark or datum for the graduations of the graduated drum 12a which, as is usual in this case is attached firmly to the shaft of the radiogoniometer and turns rigidly with the latter.

The operating method of this device is evident.

The disk 5, by making two revolutions to the one revolution of the frame, allows the transformation of the quadrantal correction into a semi-circular correction. The inclination of the disk 5 which is determined by the error curve, imparts to the needle oscillations, in the manner that its position in front of the graduated cylinder indicates the corrected bearing.

It is of course understood that in place of the disk and the grooved crown any other means may be employed for the purpose of transmitting the oscillating movement of the disk to the needle.

Figure 3:
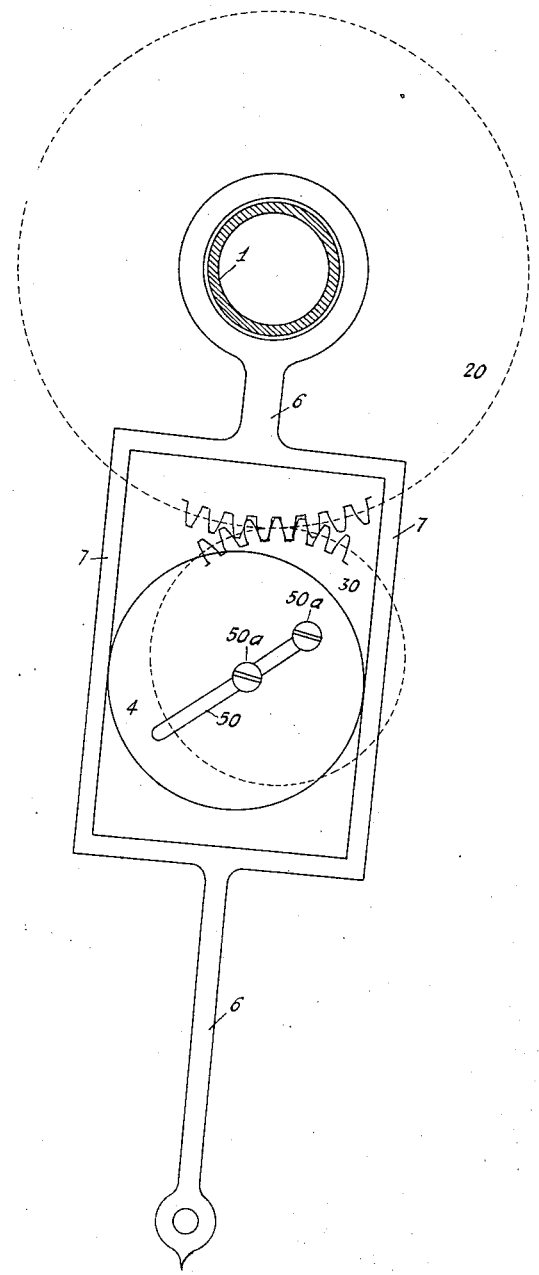
Fig. 3 shows a modified form of the invention referring to the drawings.

Fig. 3 shows another embodiment of the invention. 1 represents a cross-section of the tube, which is the principal support of the radiogoniometer, and on which is disposed the toothed wheel 20 which engages the pinion 30 which contains half the number of teeth than wheel 20. The pinion 30 turns freely around an axis which is rigidly attached to the solid frame of the apparatus.

To the pinion 30 is attached a disk 40 containing a diametral groove 50 by means of which the disk 40 may be disposed more or less eccentrically with regard to pinion 30. Two screws 50a which may be screwed into the plate of pinion 30 allow the adjustment and the fixing of the position of disk 40 with respect to pinion 30. It is understood that, of course any other system of mounting the two pieces eccentrically may be made use of.

The needle 60 is idling on shaft 1 and is provided with a rectangle 70 of a width equal to the diameter of disk 40.

If wheel 20 and pinion 30 turn, the needle swings around its middle position by an angle which depends on the amount of the eccentricity of disk 40 with respect to pinion 30. In case where these two elements are concentric with respect to each other the needle does not vary at all. The amount of eccentricity to be used is determined by a study of the error curve.

It is well understood that the invention is subject to numerous variations in its embodiments: thus instead of using a geared transmission a friction transmission may be employed, or a belt drive, interposed wheels may be used, the ball race 5 (Fig. 2) may be replaced by a circular cam path to which the end of linking bar 11 is attached in a convenient manner and guided, the cam 4 of Fig. 3 may have a form other than circular and may act upon the indicating finger by using suitable means.

Having now described my invention what I claim is

1. Means for automatically applying corrections to the indicator of a direction finder including a loop aerial, comprising a reading dial rigidly attached to the axis of the loop aerial, an index hand or pointer pivotally mounted for oscillation about the axis of the loop aerial in a plane parallel to the dial in view of indicating the divisions thereof, a secondary shaft, means interconnecting the said loop and said shaft to cause rotation of the said secondary shaft simultaneously with rotation of the dial and twice faster than the latter, and means comprising a mechanical coupling between the pointer and the said secondary shaft together with means for transferring the movement from the latter to the index hand, one turn of the secondary shaft corresponding to a complete oscillation of the pointer.

2. Means for automatically applying corrections to readings taken on a direction finder inherently subject to pointing errors, comprising a reading dial rigidly attached to the axis of the direction finder aerial, an index hand pivotally mounted for oscillation about the axis of the said aerial in a plane parallel to the dial, said pointer cooperating with said dial to indicate the readings on the dial, a secondary shaft, means for rotating the said secondary shaft conjointly with rotation of the aerial and twice faster than the latter, and means comprising a mechanical connection between the index hand and the secondary shaft to transfer the movement from the latter to the index hand, a rotation of the secondary shaft corresponding to a complete oscillation of the index hand, and means in said connection to regulate the amplitude of this oscillation.

3. An arrangement for automatically applying corrections to the apparent pointing position of the signal responsive member of a direction finder, comprising a reading dial mounted for rotation with said member, an index hand mounted to oscillate about the axis of said member in a plane parallel to the dial and disposed to indicate the divisions of the dial, a secondary shaft, a speed-doubling gearing driven by rotation of said member and driving the said secondary shaft, and means comprising a mechanical connection between the index hand and the secondary shaft for transferring the movement from the latter to the index hand, one rotation of the secondary shaft corresponding to a complete oscillation of the index hand.

4. A device for automatically applying to the indicator of a radio direction finder which includes an absorption member inherently subject to pointing errors which is mounted on a rotatable shaft, comprising a reading dial rigidly attached to said shaft, a pointer mounted so as to be able to oscillate around the axis of said shaft in a plane parallel to the dial and disposed to cooperate with the divisions on said dial, a secondary shaft parallel to the axis of said dial, a speed-doubling gearing driven by said shaft and driving said secondary shaft, and means comprising a mechanical coupling between the pointer and the said secondary shaft to transfer movement from the latter to the former, one rotation of the secondary shaft corresponding to a complete oscillation of the pointer.

5. A device for the automatic correction of errors in radiogoniometers which includes a loop aerial mounted on a rotatable shaft, comprising a reading dial rigidly attached to the shaft of the loop aerial, a pointer mounted in a way so as to be pivotal about the axis of the loop aerial in a plane parallel to the dial to indicate the divisions thereof, a secondary shaft parallel to the axis of the loop aerial, a speed-doubling gearing driven by the said rotatable shaft and driving the said secondary shaft, a cam attached to the secondary shaft, and means actuated by the said cam to control the oscillations or swings of the pointer.

6. Means for automatically correcting pointing errors inherent in a radiogoniometer including a signal responsive member mounted on a rotatable shaft, comprising a reading dial rigidly attached to the shaft of the signal responsive member, a pointer mounted for oscillation about said shaft in a plane parallel to the dial and disposed to indicate the position of the signalling source on the dial, a secondary shaft parallel to said rotatable shaft, a speed-doubling gear driven by the said rotatable shaft and driving the said secondary shaft, a cam of regulable eccentricity attached to the said secondary shaft, and means to control the oscillations of the pointer by the said cam.

ETTORE BELLINI.